UNITED STATES PATENT OFFICE.

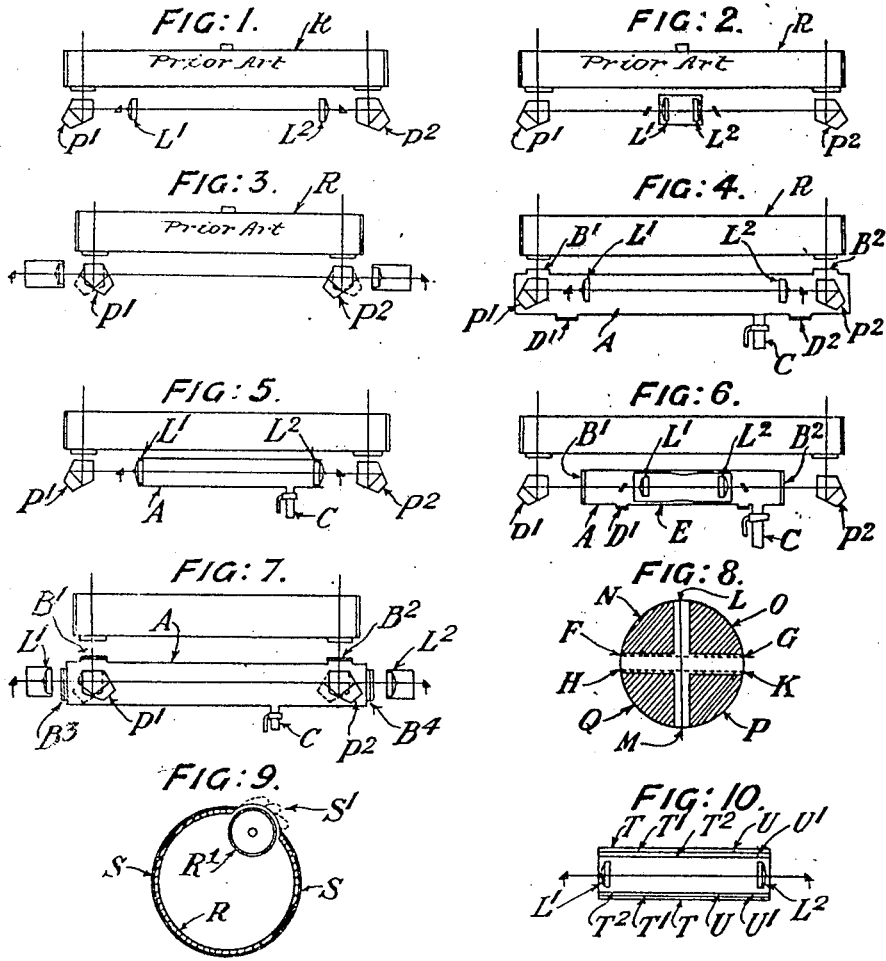

ARCHIBALD BARR AND WILLIAM STROUD, OF GLASGOW, SCOTLAND, ASSIGNORS TO BARR AND STROUD, LIMITED, OF GLASGOW, SCOTLAND.

OPTICAL ADJUSTER FOR RANGE-FINDERS.

1,272,326.      Specification of Letters Patent.      Patented July 9, 1918.

Application filed June 8, 1915. Serial No. 32,989.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in Optical Adjusters for Range-Finders, of which the following is a specification.

The object of this invention is to provide means for eliminating or reducing the errors arising from variations in refractive power throughout the columns of air traversed by the beams of light in optical adjusting devices for use in connection with rangefinders.

In all types of optical adjusters there exists liability to errors, arising from variations in refracting power (due to variation of temperature) throughout the columns of air traversed by the beams of light. The magnitude of the probable resulting error will also depend upon the lengths of the paths of the beams, and thus becomes of greater and greater importance in the case of most adjusting devices, as the base length of the rangefinder is increased.

If one side of a column of air is maintained at a higher temperature than the other side, the density and refracting power of the air at that side will be smaller, with the result that the beam in the direction of the length of the column will follow a curved instead of a straight path. The amount of bending will depend upon the temperature gradient across the beam and the total length of the column of air.

According to our present invention we eliminate or reduce these air refraction errors by providing means for reducing to a minimum the difference in refractive indices of the portions of air through which the two sides of the adjuster beams respectively pass. This we accomplish by reducing the pressure of the air in which case differences of temperature produce much smaller differences in the refractive index.

In the further description of our invention reference will be made to some examples of construction illustrated in the accompanying drawing, in which:—

Figures 1, 2 and 3 are diagrammatic representations of adjusters of known types shown in connection with rangefinders of the short base single observer type.

Figs. 4, 5, 6 and 7 show adjusters of the type represented by Figs. 1, 2 and 3, to which our invention is applied in one of its forms.

Fig. 8 is a section of an adjuster at an objective to illustrate details of construction.

Fig. 9 is a transverse section of a rangefinder tube within which the adjuster parts are adapted to be inclosed.

Fig. 10 is a longitudinal sectional illustration of a detail to be described.

In Figs. 1 and 2 two forms of one class of adjuster and in Fig. 3 an example of another class of adjuster are shown in association with a rangefinder R.

When the objective mark glasses $L^1$ and $L^2$ are situated near the ends of the apparatus (as in Fig. 1) the length of the column of air traversed by each of the beams of light is at least equal to the length of the base, and the effects of refraction caused by inequalities in the refractive power of the air on the two sides of the beam are additive. When the objective mark glasses $L^1$ and $L^2$ are placed nearer together as indicated in Fig. 2, the errors are still additive, but the total length of the column of air traversed is reduced inasmuch as it is approximately the length of the base plus the length between the objectives $L^1$ and $L^2$.

When the adjuster is of the type indicated in Fig. 3, the errors are again additive, and the total column of air is again at least twice the length of the base.

Figs. 4, 5, 6 and 7 illustrate some of the ways of carrying our invention into effect by means of partial evacuation in the case of adjusters of the type illustrated.

In Fig. 4, A is an airtight case inclosing almost the whole of the space traversed by the adjuster beams of light, $B^1$ and $B^2$ are windows through which the adjuster beams of light emerge in their passage to the rangefinder. $D^1$ and $D^2$ are windows through which light passes to illuminate the adjuster marks, and C is a connection between the interior of the case A and the appliance employed for evacuating the case. The connection C may be provided with a stop cock, valve, or other device to enable the connection to be interrupted. The appliance employed for wholly or partially evacuating the case, such for example, as a hand or a power driven pump, may be separate from the adjuster, or it may be combined with it, In Fig. 5 the airtight case A incloses the space between the objective mark glasses L¹ and L², which in this particular example comprises a large proportion of the total length of the column of air.

For practical reasons, as for example, to facilitate the adjustment of the objective mark glasses or to relieve them of all air pressure stresses, we may inclose the ends of the airtight case by means of parallel plane glass windows, situated immediately within or beyond the objective mark glasses L¹ and L².

Fig. 6 illustrates an arrangement similar to that of Fig. 5, with the objective mark glasses L¹ and L² mounted comparatively closely to one another instead of at the ends of the adjuster. The interior of the case E is in communication with the interior of the case A or directly with the evacuating apparatus.

Fig. 7 is a further example of the application of our invention, in this instance to an adjuster of the type illustrated in Fig. 3. A is the airtight case, C the connection to the evacuating appliance. B¹ B² B³ B⁴ are windows for the light leaving and entering the adjuster. The case A may evidently be arranged so as not to include the prisms P¹ P². In this case the windows B¹ B², Fig. 7, are not required, but must be placed between the prisms P¹ and P² in the manner illustrated in Fig. 6.

Windows or objective mark glasses or other optical parts that are subjected to differential air pressure may be supported by any suitable supporting piece over the portions not traversed by the beams of light. In the adjusters illustrated in Figs. 1 to 3, for example, the height of the prisms P¹ P² and the width of the vertical line or other mark on the objective mark glass L¹ or L² are generally small compared with the diameter of the objective mark glass or the window aperture. In Fig. 8 the area within the dotted lines FGHK is that traversed by the beam leaving the object glass in its passage to the prism P¹ or P². The strip adjoining the mark line LM is that traversed by the light illuminating the mark and proceeding from it. The areas below the shaded portions N O P and Q are those that are not traversed by light and that may be supported.

In the example illustrated the shaded portions N O P Q indicate means for giving support at the portions of the transverse surface of the window, objective mark glass or other optical part of the adjuster not traversed by beams of light against which these portions may rest.

In Figs. 1 to 7 the adjuster parts are held in a tube separate from that of the rangefinder, but the adjuster parts are frequently inclosed in the tube or case which forms the body of the rangefinder. In this case we may evacuate the case of the rangefinder and adjuster.

To obtain the necessary air-tightness of the rangefinder case, which will generally be pierced in places for the accommodation of external working parts, such as the range head, adjusting heads and focusing levers, we may arrange that the parts connecting external with internal operating members may be made airtight or nearly so, or we may inclose the rangefinder case wholly or partially in an impervious non-rigid cover, as for example, a cover of india rubber or suitably prepared cloth. The apertures through which the light enters and leaves the rangefinder may be sealed to the cover in an airtight manner. In Fig. 9 the case of a rangefinder is represented by R and the impervious cover, say of rubber material, by S. One of the operating heads in the form, say, of a roller, is represented by R¹. The extensible nature of the rubber cover combined in some instances with some looseness enables the operating head to be worked. If a non-extensible impervious material such as coated silk, or other cloth, be employed, we may make it cover the operating heads loosely as shown by the dotted portion S¹ Fig. 9.

Fig. 10 shows a construction of tubular casing which may be adopted in apparatus according to this invention for the retardation of the flow of heat into the spaces traversed by adjuster beams. We only illustrate the means as applied between the objective mark glasses of the adjuster indicated in Fig. 1, but constructions of this kind can be applied to other arrangements, some of which have been referred to already in this specification. In Fig. 10 the space between the objective mark glasses L¹ and L² is protected along its length by two or more tubular cases T T¹ T² inclosing one or more spaces U U¹. The ends of the tube T² may be closed, or in some cases left open, and the ends of the spaces U U¹, or either of them, may be left open or closed. We may extract the air from within the spaces U U¹, or either of them, and we may still further retard the flow of heat into the space contained in the tube T² by increasing the reflecting power of the surfaces of the tubular cases T T¹ T², as for example, by polishing or silvering them. Means for maintaining the spaces evacuated may be provided. We may fill the space if one only is provided or the spaces or any of them with some non-conducting material such as felt or cork or pitch or combination of these and other materials, or we may evacuate one or some of the spaces and fill one or others with non-conducting material.

We claim:

1. The method of increasing the accuracy of optical adjusters for use in connection with self-contained base rangefinders by reducing to a minimum the difference in the refractive indices of portions of the air inclosed in the apparatus through which different parts of the operative beams of light pass.

2. An optical adjuster for use in connection with a self-contained base rangefinder having a partially evacuated case inclosing the whole or a part of the space traversed by the adjuster beams of light.

3. An optical adjuster for use in connection with a self-contained base rangefinder having objective mark glasses with a space between them, an airtight case inclosing the said space, a connection with the case adapted for use in connection with an appliance for reducing the pressure within the space.

4. An optical adjuster for use in connection with a self-contained base rangefinder having objective mark glasses with a space between them, an airtight case inclosing the said space, a connection with the case adapted for use in conjunction with an appliance for reducing the pressure within the space, associated with prisms forming parts of the adjuster placed outside the airtight case.

5. An optical adjuster for use in connection with a self-contained base rangefinder having objective mark glasses with a space between them, an airtight case inclosing the said space, the case having parallel plane glass windows at its ends, a connection with the case adapted for use in conjunction with an appliance for reducing the pressure within the space, associated with prisms forming parts of the adjuster placed outside the airtight case.

6. An optical adjuster for use in connection with a self-contained base rangefinder having a partially evacuated case inclosing the whole or a part of the space traversed by the adjuster beams of light, in combination with means for giving support at portions of the transverse surfaces not traversed by beams of light of optical parts of the adjuster that are subjected to differential air pressure.

ARCHIBALD BARR.
WILLIAM STROUD.

Witnesses:
ARLINE DAVIES,
OSWIN EDWIN HOWARD BIRCHALL.